US012692113B2

(12) United States Patent
Kimata et al.

(10) Patent No.: US 12,692,113 B2
(45) Date of Patent: Jul. 28, 2026

(54) IMAGE FORMING APPARATUS, METHOD FOR PROCESSING INFORMATION RELATING TO SHEET, AND RECORDING MEDIUM

(71) Applicant: Konica Minolta, Inc., Tokyo (JP)

(72) Inventors: Akinori Kimata, Toyokawa (JP); Takahiro Tsujimoto, Toyokawa (JP); Noriyuki Jinbo, Hamamatsu (JP); Natsuyo Ida, Toyokawa (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/985,854

(22) Filed: Dec. 18, 2024

(65) Prior Publication Data

US 2025/0243022 A1 Jul. 31, 2025

(30) Foreign Application Priority Data

Dec. 25, 2023 (JP) ................................ 2023-217929

(51) Int. Cl.
*B65H 7/14* (2006.01)
*G03G 15/00* (2006.01)

(52) U.S. Cl.
CPC ........... *B65H 7/14* (2013.01); *G03G 15/5029* (2013.01); *G03G 15/6529* (2013.01); *B65H 2553/30* (2013.01); *B65H 2553/412* (2013.01); *B65H 2801/03* (2013.01); *G03G 2215/0062* (2013.01); *G03G 2215/00637* (2013.01)

(58) Field of Classification Search
CPC ........ B65H 7/02; B65H 7/14; B65H 2553/41; B65H 2553/412; B65H 2443/414; B65H 43/08; B65H 2553/30; G03G 15/50239; G03G 2215/0062; G03G 2215/00637
See application file for complete search history.

(56) References Cited

U.S. PATENT DOCUMENTS 8,875,581 B2 * 11/2014 Nakamura ......... G03G 15/5029 73/632
10,599,083 B2 * 3/2020 Yoshida ............ G03G 15/5062

FOREIGN PATENT DOCUMENTS

JP 2018-106112 A 7/2018

* cited by examiner

*Primary Examiner* — Jeremy R Severson
(74) *Attorney, Agent, or Firm* — Osha Bergman Watanabe & Burton LLP

(57) ABSTRACT

An image forming apparatus includes: a conveyor that conveys a sheet along a conveyance path; a detector that is disposed on the conveyance path and detects a physical property of a sheet with first detection accuracy or second detection accuracy lower than the first detection accuracy; an image former that forms an image on a sheet under an image forming condition based on a result of detection performed by the detector with the first detection accuracy; and a determiner that determines that a physical property of a sheet has changed among a plurality of sheets that is conveyed along the conveyance path on the basis of a result of detection performed by the detector on the plurality of sheets that is conveyed with the second detection accuracy.

10 Claims, 8 Drawing Sheets

RELATIONSHIP BETWEEN SHEET TYPE AND CONVEYANCE SPEED

| SHEET TYPE | SHEET FEED SPEED [mm/s] | PROCESS SPEED [mm/s] |
|---|---|---|
| PLAIN PAPER | 400 | 300 |
| THICK PAPER 1 | 200 | 170 |
| THICK PAPER 2 | 200 | 140 |
| THICK PAPER 3 | 150 | 120 |
| RECYCLED PAPER | 400 | 300 |

FIG. 10

SHEET FEED LINEAR SPEED AND DETECTION PARAMETER

| | | | |
|---|---|---|---|
| SHEET FEED SPEED [mm/s] | 150 | 200 | 400 |
| NUMBER OF LEDS | 3 | 3 | 3 |
| PARAMETER | | | |
| NUMBER OF TIMES OF DETECTION PER SECTION | 3 | 2 | 2 |
| TIME FOR ONE DETECTION [s] | 0.010 | 0.009 | 0.009 |
| TURNING-OFF TIME [s] | 0.010 | 0.010 | 0.000 |
| NUMBER OF REPETITIONS OF DETECTION PATTERN [TIMES] | 5 | 4 | 2 |
| | | | |
| NUMBER OF TIMES OF SAMPLING/LED | 15 | 8 | 4 |
| DETECTION TIME [s] | 0.150 | 0.108 | 0.054 |
| DETECTION DISTANCE RANGE [mm] | 30.0 | 21.6 | 21.6 |

IMAGE FORMING APPARATUS, METHOD FOR PROCESSING INFORMATION RELATING TO SHEET, AND RECORDING MEDIUM

CROSS-REFERENCE TO RELATED APPLICATION

The disclosure of Japanese Patent Application No. 2023-217929 filed on Dec. 25, 2023, including description, claims, drawings, and abstract, is incorporated herein by reference in its entirety.

BACKGROUND OF THE INVENTION

1. Technical Field

The present invention relates to an image forming apparatus such as a copier, a printer, or a multifunctional digital apparatus called a multifunction peripheral (MFP). The present invention further relates to a method for processing information relating to a sheet and a recording medium.

2. Description of Related Art

An electrophotographic image forming apparatus feeds sheets contained in a sheet feed cassette one by one and conveys the sheet to a conveyance path, transfers an image such as a toner image to the sheet being conveyed, and then thermally fixes the image on the sheet.

In order to form an appropriate image on a sheet, it is necessary to select a favorable image forming condition in accordance with a physical property of the sheet.

In view of this, Japanese Unexamined Patent Application Publication No. 2018-106112 discloses an image forming apparatus in which a medium sensor that detects a physical property of a sheet is provided in a conveyance path of the sheet, and the physical property of the sheet is automatically acquired. The image forming apparatus determines an image forming condition in accordance with the acquired physical property.

Incidentally, in a case where the remaining amount of sheets in a sheet feed cassette that contains sheets becomes small, a user opens the sheet feed cassette and replenishes the sheet feed cassette with sheets. Furthermore, in a case where sheets remain in the sheet feed cassette at the time of replenishment of sheets, the user may replenish sheets by stacking the sheets on the remaining sheets.

However, the sheets remaining in the sheet feed cassette and the replenished sheets do not necessarily have the same physical property. There are cases where a user erroneously replenishes sheets having a different physical property. In this case, the physical property of the sheet may change in the middle of a print job.

For this reason, in order to appropriately perform image formation even if the physical property of the sheet is changed in the middle of a print job, it is necessary to detect a plurality of sheets conveyed from the sheet feed cassette by a medium sensor and determine that the physical property of the sheet is changed in the middle of the print job.

The image forming apparatus described in the aforementioned Japanese Unexamined Patent Application Publication No. 2018-106112 detects a sheet with a medium sensor, and detects that there has been a change in a physical property of the sheet being conveyed.

However, in a case where all the sheets are detected with high detection accuracy, for example, it is necessary to reduce conveyance speed in order to maintain the detection accuracy, which causes a problem of a reduction in productivity.

SUMMARY OF THE INVENTION

An object of the present invention is to provide an image forming apparatus capable of detecting that a physical property of a sheet has changed during conveyance while suppressing a reduction in productivity, a method for processing information relating to a sheet, and a recording medium.

A first aspect of the present invention relates to an image forming apparatus including:

a conveyor that conveys a sheet along a conveyance path;

a detector that is disposed on the conveyance path and detects a physical property of a sheet with first detection accuracy or second detection accuracy lower than the first detection accuracy;

an image former that forms an image on a sheet under an image forming condition based on a result of detection performed by the detector with the first detection accuracy; and a determiner that determines that a physical property of a sheet has changed among a plurality of sheets that is conveyed by the conveyor along the conveyance path on the basis of a result of detection performed by the detector on the plurality of sheets that is conveyed with the second detection accuracy.

A second aspect of the present invention relates to a method for processing information relating to a sheet including:

by a conveyor, conveying a sheet along a conveyance path;

by a detector that is disposed on the conveyance path, detecting a physical property of a sheet with first detection accuracy or second detection accuracy lower than the first detection accuracy;

forming an image on a sheet under an image forming condition based on a result of detection performed by the detector with the first detection accuracy; and determining that a physical property of a sheet has changed among a plurality of sheets that is conveyed by the conveyor along the conveyance path on the basis of a result of detection performed by the detector on the plurality of sheets that is conveyed with the second detection accuracy.

A third aspect of the present invention relates to a non-transitory recording medium storing a computer readable program for causing a computer of an image forming apparatus including a conveyer that conveys a sheet along a conveyance path, and a detector that is disposed on the conveyance path and detects a physical property of a sheet with first detection accuracy or second detection accuracy lower than the first detection accuracy, to form an image on a sheet under an image forming condition based on a result of detection performed by the detector with the first detection accuracy, and to determine that a physical property of a sheet has changed among a plurality of sheets that is conveyed by the conveyor along the conveyance path on the basis of a result of detection performed by the detector on the plurality of sheets that is conveyed with the second detection accuracy.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention.

FIG. 10 is a table illustrating an example of a combination of sheet feed speed and detection parameters.

DETAILED DESCRIPTION

Hereinafter, one or more embodiments of the present invention will be described with reference to the drawings. However, the scope of the invention is not limited to the disclosed embodiments.

Hereinafter, an embodiment of the present invention will be described with reference to the drawings.

Figure 1:
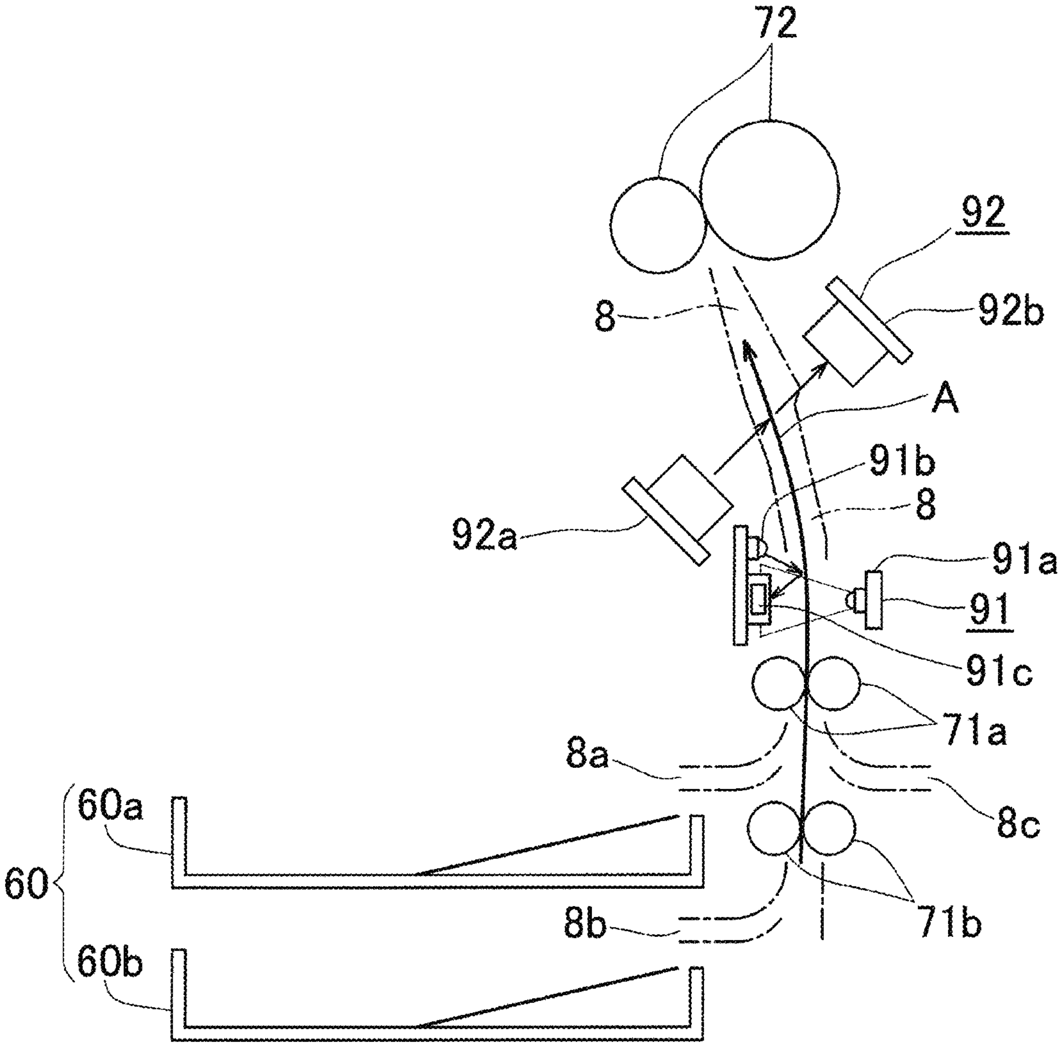
FIG. 1 is a diagram schematically illustrating a part of a conveyance path of a sheet on which an image is printed in an image forming apparatus.

FIG. 1 is a diagram schematically illustrating a part of a conveyance path for conveying a sheet such as paper on which an image is printed in an image forming apparatus 1 according to an embodiment of the present invention.

Examples of the image forming apparatus 1 include, but are not limited to, a copier, a printer, and an MFP which is a digital multifunction apparatus.

In FIG. 1, a sheet feeder 60 is provided at a lower portion of the image forming apparatus 1. In the sheet feeder 60, a first sheet feed tray 60*a* which is a first-stage sheet feed cassette in an upper stage and a second sheet feed tray 60*b* which is a second-stage sheet feed cassette in a lower stage are arranged. Furthermore, a sheet conveyance path 8 is formed in a vertical direction so as to communicate with a sheet feed port 8*a* of the first sheet feed tray 60*a* and a sheet feed port 8*b* of the second sheet feed tray 60*b*. A sheet fed from the sheet feed port 8*a* of the first sheet feed tray 60*a* or the sheet feed port 8*b* of the second sheet feed tray 60*b* to the sheet conveyance path 8 is conveyed as follows. That is, the sheet is conveyed upward in the sheet conveyance path 8 as indicated by arrow A to a pair of skew correction rollers 72 installed at the position of an upper portion of the sheet conveyance path 8 by conveyance rollers (corresponding to a conveyor) 71*a* and 71*b*, and the like.

Furthermore, a manual sheet feed tray (not illustrated) is provided on the opposite side of the first sheet feed tray 60*a* with the sheet conveyance path 8 interposed therebetween. A sheet set on the manual sheet feed tray is supplied to the sheet conveyance path 8 via a manual sheet feed port 8*c*.

A user can open and close the first sheet feed tray 60*a*, the second sheet feed tray 60*b*, and the manual sheet feed tray with respect to the image forming apparatus 1. Opening the first sheet feed tray 60*a* and the second sheet feed tray 60*b* means removing the first sheet feed tray (sheet feed cassette) 60*a* and the second sheet feed tray (sheet feed cassette) 60*b* from a main body of the apparatus for the purpose of replacement of a sheet, addition of a sheet, or the like. Opening the manual sheet feed tray means that a sheet is removed from the manual sheet feed tray to bring the manual sheet feed tray into a non-use state.

On the other hand, closing the first sheet feed tray 60*a* and the second sheet feed tray 60*b* means attaching the first sheet feed tray 60*a* and the second sheet feed tray 60*b* to the main body of the apparatus. Closing the manual sheet feed tray means setting a sheet on the manual sheet feed tray and bringing the manual sheet feed tray into a use state.

Furthermore, opening the first sheet feed tray 60*a*, the second sheet feed tray 60*b*, and the manual sheet feed tray is also referred to as opening the sheet feed ports 8*a*, 8*b*, and 8*c*. Closing the first sheet feed tray 60*a*, the second sheet feed tray 60*b*, and the manual sheet feed tray is also referred to as closing the sheet feed ports 8*a*, 8*b*, and 8*c*. The opening and closing of the first sheet feed tray 60*a* and the second sheet feed tray 60*b* can be detected by a sensor (not illustrated). The opening and closing of the manual sheet feed tray can be detected on the basis of whether a sheet is present on the manual sheet feed tray.

The skew correction rollers 72 are rollers for correcting skew (inclination) of a sheet conveyed in the sheet conveyance path 8.

Between the sheet feed port 8*a* of the first sheet feed tray 60*a* in the upper stage and the skew correction rollers 72, two medium detection sensors 91 and 92 are arranged on the upstream side and the downstream side in a conveyance direction in the sheet conveyance path 8. The medium detection sensors 91 and 92 detect a physical property of a sheet, and correspond to a detector. The medium detection sensor 91 on the upstream side is an optical sensor that detects light emitted to the sheet. The medium detection sensor 92 on the downstream side is an ultrasonic sensor that detects an ultrasonic wave output toward the sheet. Note that the optical sensor 91 may be disposed on the downstream side, and the ultrasonic sensor 92 may be disposed on the upstream side.

Figure 2:
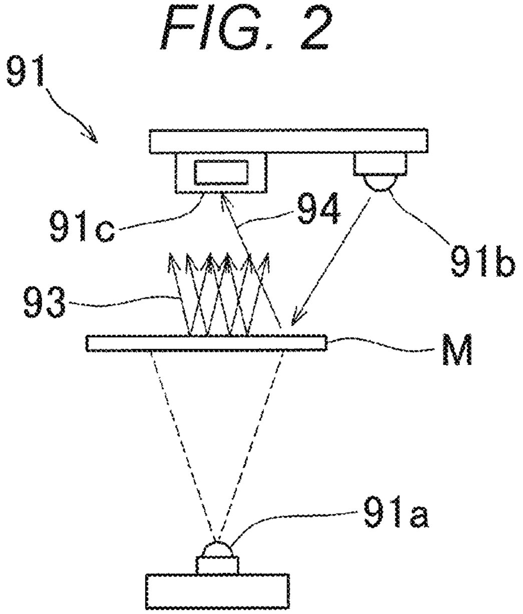
FIG. 2 is an explanatory diagram of an optical sensor.

FIG. 2 is an explanatory diagram of the optical sensor 91. The optical sensor 91 includes a transmission light source 91*a* such as an LED, a reflection light source 91*b* such as an LED, and a light receiving element 91*c* such as a photodiode. The light receiving element 91*c* detects, as physical property values, the amount of transmitted light 93, which is light emitted from the transmission light source 91*a* and transmitted through a sheet M conveyed in the sheet conveyance path 8 and the amount of reflected light 94, which is light emitted from the reflection light source 91*b* and reflected by the sheet M.

The optical sensor 91 may include a plurality of different transmission light sources 91*a* and reflection light sources 91*b*. Examples of the transmission light source 91*a* and the reflection light source 91*b* include an infrared light source (IR), a blue light source (B), and a green light source (G).

Figure 3:
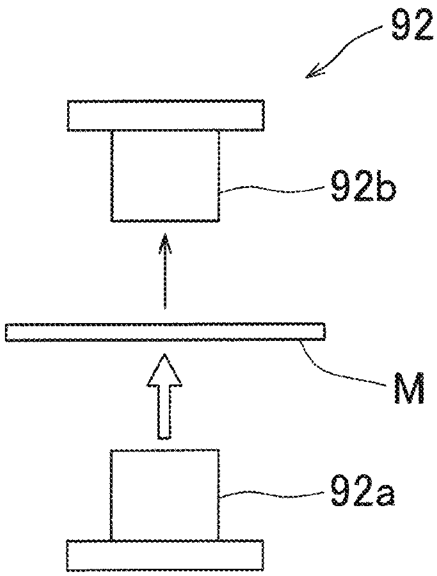
FIG. 3 is an explanatory diagram of an ultrasonic sensor.

FIG. 3 is an explanatory diagram of the ultrasonic sensor 92. The ultrasonic sensor 92 includes a pair of an ultrasonic transmitter 92*a* and an ultrasonic receiver 92*b* which are opposed to each other with the sheet conveyance path 8 interposed therebetween and obliquely disposed with respect to a direction in which the sheet M passes (see FIG. 1). The ultrasonic sensor 92 transmits an ultrasonic wave from the ultrasonic transmitter 92*a* to the passing sheet M, and receives the ultrasonic wave transmitted through the sheet M by the ultrasonic receiver 92*b*. Then, a controller 100, which will be described later, detects the sheet type by determining whether the sheet M is a single sheet or a two-ply sheet (envelope) on the basis of the amount of attenuation of the ultrasonic wave by the sheet M.

In the present embodiment, the physical property of the sheet also includes numerical information (the amount of received light) which is a detection result of transmitted light and reflected light of the optical sensor 91. Furthermore, the physical property of the sheet also includes numerical information (received ultrasonic wave) as a detection result of the ultrasonic sensor 92. In the present embodiment, as will be described later, acquisition of the physical property by the medium detection sensors 91 and 92 is performed for each sheet, and the presence or absence of addition is detected from the change amount of the physical property.

Note that in the present embodiment, the image forming apparatus 1 has a user designation mode and an automatic detection mode, and a user can select one of the modes. The user designation mode is a mode in which a user designates a sheet type. When the user designation mode is selected, the detection of a physical property of a sheet and the determination of the sheet type by the medium detection sensors 91 and 92 are not performed. When the automatic detection mode is selected, the detection of the physical property and the determination of the sheet type by the medium detection sensors 91 and 92 are performed.

Figure 4:
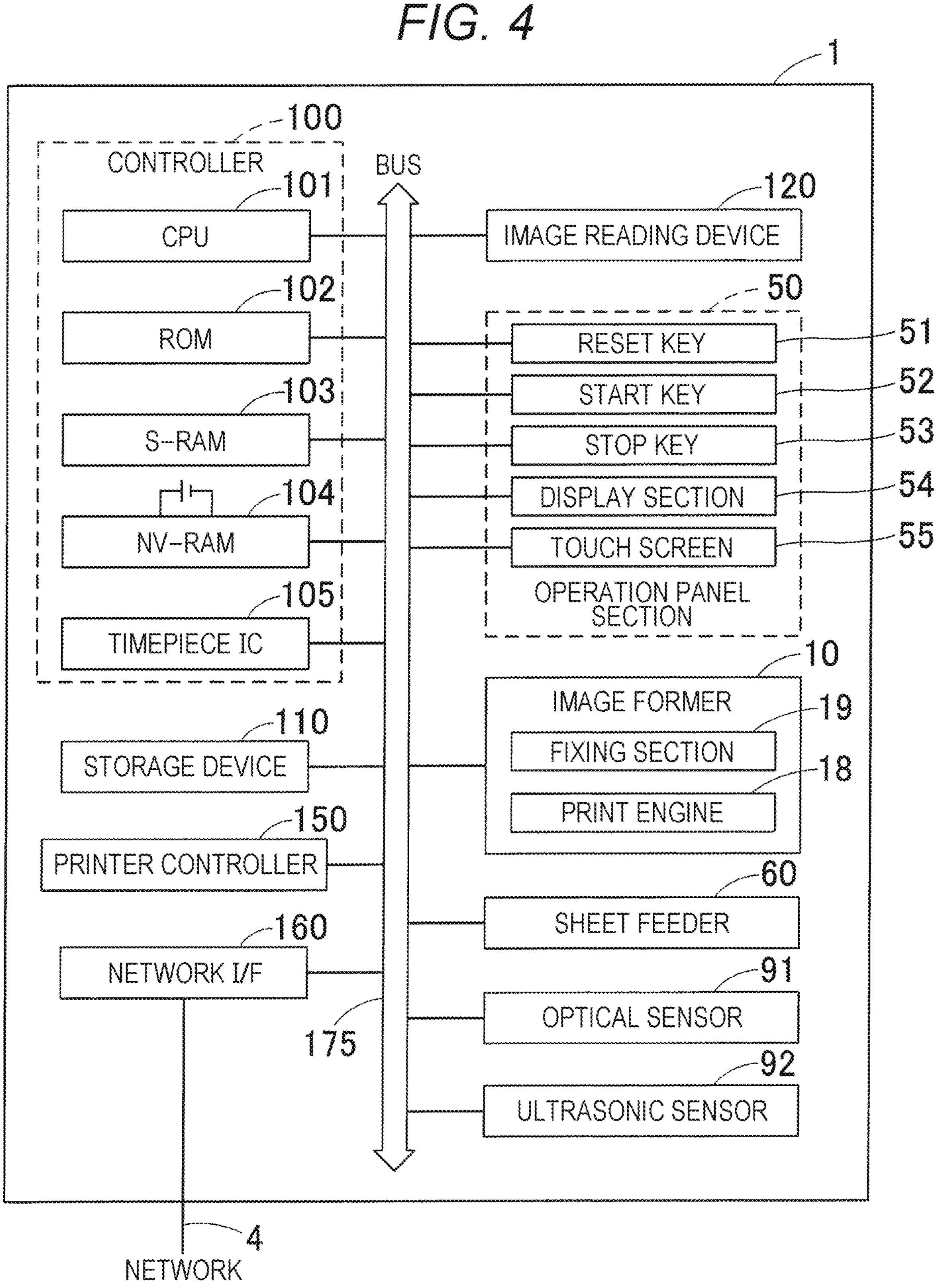
FIG. 4 is a block diagram illustrating an electrical configuration of the image forming apparatus.

FIG. 4 is a block diagram illustrating an electrical configuration of the image forming apparatus 1. As illustrated in FIG. 4, the image forming apparatus 1 includes the controller 100, a storage device 110, an image reading device 120, an operation panel section 50, an image former 10, the sheet feeder 60, and the optical sensor 91 and the ultrasonic sensor 92 described above. The image forming apparatus 1 further includes a printer controller 150, a network interface (network I/F) 160, and the like. The above-described section, devices, and the like are connected to each other via a system bus 175.

The controller 100 includes a central processing unit (CPU) 101, a read only memory (ROM) 102, a static random access memory (S-RAM) 103, a non-volatile RAM (NV-RAM) 104, and a timepiece IC 105.

The CPU 101 comprehensively controls the entire image forming apparatus 1 by executing an operating program stored in the ROM 102 or the like. The CPU 101 controls, for example, a copy function, a printer function, a scan function, and the like such that the copy function, the printer function, the scan function, and the like are executable. In particular, in the present embodiment, the CPU 101 executes detection of a physical property of a sheet based on detection of the amount of light by the optical sensor 91 and detection of an ultrasonic wave by the ultrasonic sensor 92. Then, the CPU 101 determines the sheet type on the basis of the detection result, or determines that the physical property of the sheet has changed. That is, the CPU 101 functions as a determiner. At the time of printing, the CPU 101 automatically sets an image forming condition corresponding to the sheet type on the basis of the determination result and executes printing. Furthermore, the CPU 101 stores and accumulates the physical property of the sheet detected by the optical sensor 91 and the ultrasonic sensor 92, the determination result of the sheet type, a change in the physical property, and the like in the storage device 110. Furthermore, the CPU 101 executes control processing such as output to the operation panel section 50 or an external apparatus.

The ROM 102 stores programs to be executed by the CPU 101 and other data.

The S-RAM 103 serves as a working area for the CPU 101 to execute the programs. The S-RAM 103 temporarily stores the programs, data used for executing the programs, and the like.

The NV-RAM 104 is a nonvolatile memory backed up by a battery. The NV-RAM 104 stores various settings relating to image formation, the number of pixels of a display section 54, data of various screens to be displayed on the display section 54, and the like.

The timepiece IC 105 measures time, functions as an internal timer, and measures a processing time.

The storage device 110 includes a hard disk or the like, and stores programs, various types of data, and the like. Particularly, in the present embodiment, the detection result of the physical property of the sheet detected by the optical sensor 91 and the ultrasonic sensor 92, the determination result of the sheet type, a detection history, and the like are accumulated. The storage device 110 further stores, as a database, an allowable change amount when the physical property of the second and subsequent sheets changes from the physical property of the first sheet in the job.

The image reading device 120 includes a scanner or the like, reads a document set on a platen glass by scanning the document, and converts the read document into image data.

The operation panel section 50 is used for a user to provide an instruction such as a job to the image forming apparatus 1 and set various settings. The operation panel section 50 includes a reset key 51, a start key 52, a stop key 53, the display section 54, and a touch screen 55.

The reset key 51 is used to reset a setting. The start key 52 is used for a starting operation of scanning or the like. The stop key 53 is pressed to interrupt the operation.

The display section 54 includes, for example, a liquid crystal display device, and outputs and displays messages, various operation screens, and the like. The touch screen 55 is formed on a screen of the display section 54, and detects a user's touch operation.

The image former 10 prints, on a sheet, a copy image generated from image data of a document read by the image reading device 120 or from print data transmitted from an external terminal apparatus 3 or the like. The image former 10 includes a print engine 18 and a fixing section 19 that fixes an image by heating and pressing a sheet on which the image is formed. The print engine 18 includes hardware components for image formation, such as a photosensitive drum, a charging device, an exposure device, a developing device, a transfer belt, and a transfer roller.

The network I/F 160 functions as communication means that transmits and receives data to and from the external apparatus via a network 4. The external apparatus is, for example, an external server, a cloud system, a printer driver of an information terminal apparatus of a user, another image forming apparatus, or the like.

Figure 5:
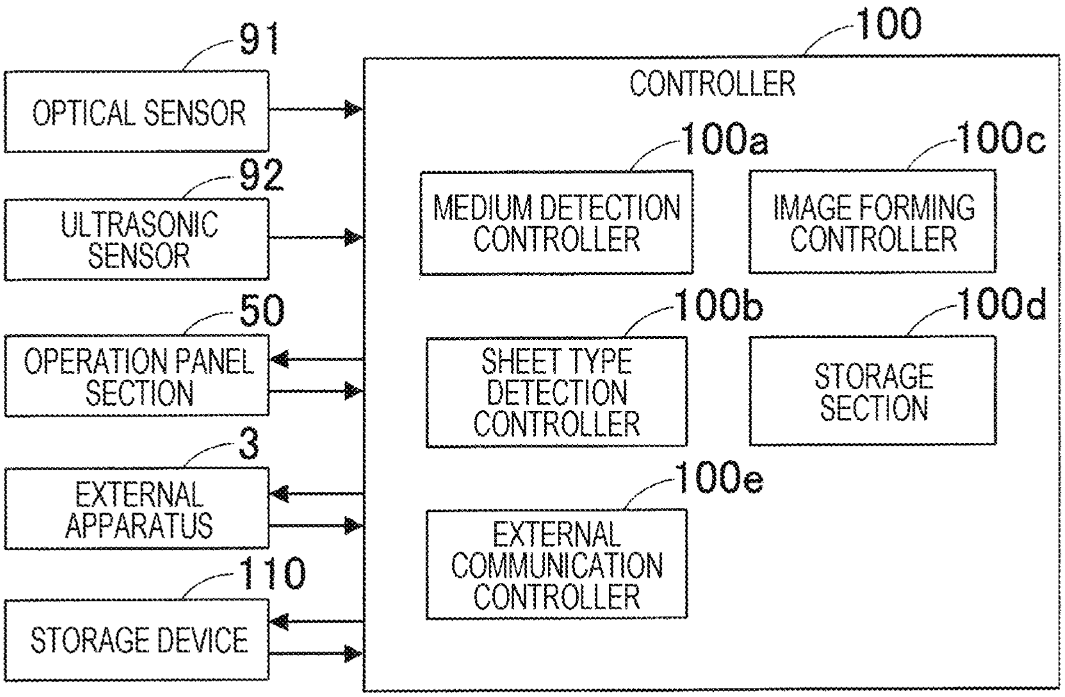
FIG. 5 is a block diagram illustrating a functional configuration of a controller of the image forming apparatus.

FIG. 5 is a block diagram illustrating a functional configuration of the controller 100. The controller 100 functionally includes a medium detection controller 100*a*, a sheet type detection controller 100*b*, an image forming controller 100*c*, a storage section 100*d*, and an external communication controller 100*e*.

The medium detection controller 100*a* causes the optical sensor 91 and the ultrasonic sensor 92, which are medium detection sensors, to operate in a first detection mode and a second detection mode, which will be described later, to detect a physical property and the like of a sheet. The sheet type detection controller 100*b* determines the sheet type on the basis of the detection results by the optical sensor 91 and the ultrasonic sensor 92, or determines whether or not there is addition, that is, the presence or absence of addition from a change in the physical property of the sheet.

The image forming controller 100*c* controls the image former 10 under an image forming condition corresponding to each sheet type on the basis of the sheet type detected by the sheet type detection controller 100*b*, and prints an image on the sheet.

The storage section 100*d* temporarily stores the detection result of the physical property of a sheet by the optical sensor 91 and the ultrasonic sensor 92. The storage section 100*d* further temporarily stores a detection result of the sheet type in the sheet type detection controller 100*b*, a detection history, and the like. The information stored in the storage section 100*d* is transferred to the storage device 110 illustrated in FIG. 4, and is accumulated and updated.

The external communication controller 100*e* corresponds to the network I/F 160 illustrated in FIG. 4. The external communication controller 100*e* performs data transmission and reception with the external apparatus 3 such as an external server, a USB-connected management personal computer, a terminal apparatus of the user, or another image forming apparatus. The external communication controller 100*e* can also transmit the information stored in the storage section 100*d* to the external apparatus 3. For example, when a change in the physical property of the sheet is detected, the fact that there has been addition of a sheet may be output to the terminal apparatus of the user, or the like and may be displayed on the screen of the terminal apparatus or the like to notify the user of the fact.

Next, the operation of the image forming apparatus 1 will be described focusing on control by the controller 100.

In the present embodiment, in each of the first detection mode and the second detection mode, the controller 100 causes the optical sensor 91 and the ultrasonic sensor 92 to detect the physical property and the sheet type of the sheet M conveyed in the sheet conveyance path 8.

The first detection mode is a mode to be executed on the first sheet conveyed first. Furthermore, the first detection mode is performed with first detection accuracy. The first sheet to be conveyed first is, for example, a sheet to be conveyed first after the first or second sheet feed tray 60*a* or 60*b* is opened (the tray is removed) to perform replacement, replenishment, addition, or the like of a sheet, and the first or second sheet feed tray 60*a* or 60*b* is closed (the tray is inserted). Alternatively, in the case of the manual sheet feed tray, the first sheet to be conveyed first may be a sheet to be conveyed first after the result of detection as to whether a sheet is present indicates that a sheet is present after a state in which no sheet is present, that is, after the manual sheet feed tray is closed. Alternatively, the sheet to be conveyed first may be a sheet to be conveyed first from a sheet feed port having no sheet type information after sheet type information is reset by turning off and on the image forming apparatus 1, recovering from sleep, or the like. Alternatively, the first sheet to be conveyed first may be a sheet to be conveyed first from the sheet feed port when a medium detection function is switched from OFF to ON. Alternatively, the first sheet to be conveyed first may be a sheet to be conveyed first in a print job.

The information relating to the first sheet is undetermined. Therefore, in the first detection mode, the conveyance is performed at a low speed so that the detection result can be reflected in a process condition (image forming condition). Furthermore, the detection is performed with the first detection accuracy in order to perform detailed detection. Specifically, the number of sensor readings within the sheet surface is also increased. Thus, the number of pieces of sample data increases and accuracy is improved. The type of the sheet in the sheet feed tray is determined by the first detection mode, and the fixing temperature and the transfer current are determined under the process condition (image forming condition) corresponding to the determined sheet type. From the next sheet, printing is executed after an appropriate condition for the conveyance speed is selected.

Furthermore, the medium detection controller 100*a* determines the allowable change amount (threshold) of the physical property of the second and subsequent sheets acquired by the medium detection sensors 91 and 92 according to the sheet type determined from the physical property of the first sheet detected by the medium detection sensors 91 and 92.

On the other hand, the second detection mode is a mode in which the physical property of the sheets except for the first sheet is detected after the determination of the sheet type of the first sheet in the first detection mode. The detection in the second detection mode may be performed on all the sheets except for the first sheet. For example, the detection may be performed every plural sheets such as every other sheet or every five sheets. Alternatively, the detection may be performed at the start and end of the job except for the first sheet.

The second detection mode is a detection mode for detecting the presence or absence of addition of a sheet on the basis of a change in the physical property. Since it is not necessary to determine the sheet type, detailed detection information as in the first detection mode is not necessary. Therefore, in the second detection mode, detection is performed with the second detection accuracy lower than the first detection accuracy in the first detection mode.

By the detection in the first detection mode, the conveyance speed of the next sheet is conveyance speed corresponding to the determined sheet type. For this reason, depending on the sheet type, the conveyance speed is higher than that in the first detection mode. This shortens the time from when the sheet reaches the medium detection sensors 91 and 92 to when the sheet reaches the skew correction rollers 72. Therefore, the detection time is shorter than that in the first detection mode. For this reason, the number of times of sampling of the detection result obtained by the medium detection sensors 91 and 92 decreases, and sufficient sample data necessary for determining the sheet type cannot be obtained. However, since the conveyance speed of the sheet is higher than that in the first detection mode, productivity is improved.

In the present embodiment, the medium detection controller 100*a* determines whether or not the amount by which the physical property of the second and subsequent sheets detected by the medium detection sensors 91 and 92 has changed from the physical property of the first sheet, that is, the change amount is within the range of the allowable change amount. If the change amount is within the range of the allowable change amount, the medium detection controller 100*a* determines that the sheet type has not changed, that is, there is no addition of a sheet. If the change amount exceeds the allowable change amount, it is determined that the sheet type has changed, that is, there is addition of a sheet.

Figure 6:
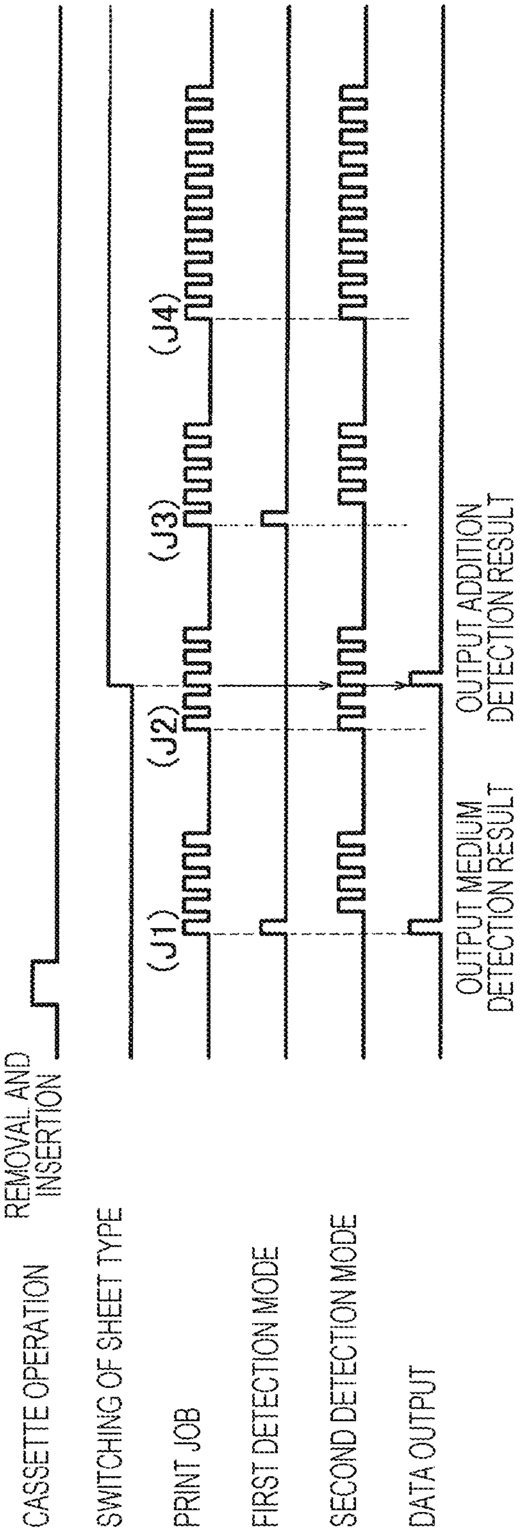
FIG. 6 is a diagram illustrating an example of a sequence in a first detection mode and a second detection mode.

FIG. 6 is a diagram illustrating an example of a sequence in the first detection mode and the second detection mode.

In this example, it is assumed that sheets of the sheet type thick paper 2 are set in the first sheet feed tray 60*a*. It is assumed that, from this state, the first sheet feed tray 60*a* is opened, and seven sheets of plain paper are added on the thick paper 2. Furthermore, it is assumed that, after, for example, the first sheet feed tray 60*a* is removed and inserted (opened and closed) as indicated by the signal of "CASSETTE OPERATION" in FIG. 6, three print jobs (J1) to (J3) each of which prints five sheets are executed as indicated by the signal of "PRINT JOB". Furthermore, it is assumed that a print job (J4) of printing 11 sheets is executed thereafter.

In the example of FIG. 6, the detection in the first detection mode is performed on the first sheet fed and conveyed from the first sheet feed tray 60*a* after the first sheet feed tray 60*a* is removed and inserted (opened and closed). In other words, detection in the first detection mode is performed on the first sheet of the print job (J1). As described above, in the first detection mode, conveyance at a low speed is performed so that the detection result can be reflected in the process condition (image forming condition). Furthermore, the detection is performed with the first accuracy that is relatively high detection accuracy.

In the present embodiment, in the first detection mode, a sheet is conveyed from the sheet feed port of the first sheet feed tray 60*a* to the medium detection sensors 91 and 92 at the sheet feed speed of thick paper 3, and the physical property of the sheet is detected. On the basis of the physical property, the sheet type is determined as follows by the medium detection controller 100*a*.

That is, the basis weight is obtained from the physical property detected by the medium detection sensors 91 and 92, and the sheet type is determined. For example, a sheet is determined to be plain paper when the basis weight is in a range of 52 to 90. In the present embodiment, seven sheets of plain paper are added on the thick paper 2. Therefore, the first sheet is determined to be plain paper. On the downstream side of the skew correction rollers 72, the sheet is conveyed at the process speed of the determined sheet type (plain paper in this case), and image formation is performed under the condition based on the sheet type. The reason why the first sheet is conveyed at the sheet feed speed of the thick paper 3 is that any sheet type can be fed because the sheet type is undetermined. However, a sheet feed speed other than the sheet feed speed for the thick paper 3 may be used as long as a sheet can be fed at the sheet feed speed.

Furthermore, as described above, the medium detection controller 100*a* determines the allowable change amount (threshold) of the physical property acquired by the medium detection sensors 91 and 92 for the second and subsequent sheets in accordance with the sheet type determined for the first sheet.

The second and subsequent sheets are conveyed to the medium detection sensors 91 and 92 at a sheet feed speed corresponding to the sheet type of the first sheet.

Figures 7, 8:
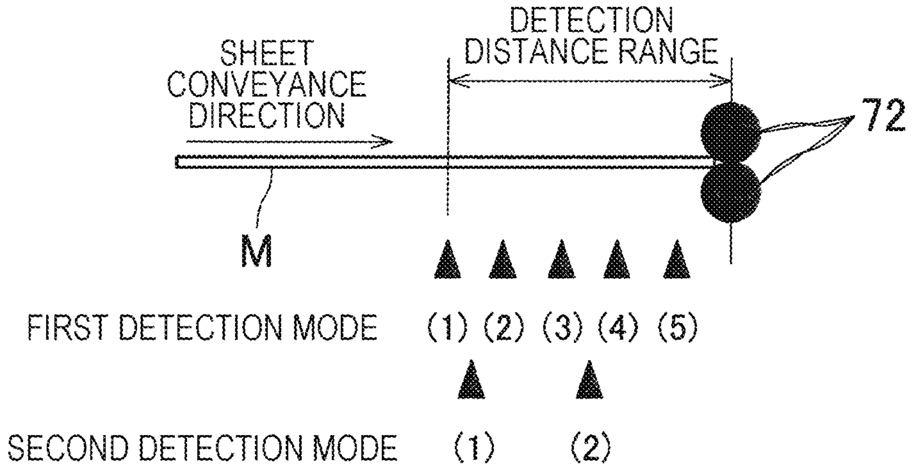
FIG. 7 is a diagram illustrating a relationship between a sheet type and conveyance speed.
FIG. 8 is a diagram illustrating the number of times of detection in the first detection mode and the second detection mode.

FIG. 7 is a diagram illustrating a relationship between a sheet type and conveyance speed. FIG. 7 illustrates the sheet feed speed and the process speed for the plain paper, the thick paper 1, the thick paper 2, the thick paper 3, and recycled paper. The sheet feed speed is conveyance speed from the sheet feed ports 8*a*, 8*b*, and 8*c* to the skew correction rollers 72. The process speed is speed from the skew correction rollers 72 to image formation. For example, the plain paper is fed from the sheet feed ports 8*a*, 8*b*, and 8*c* to the skew correction rollers 72 at conveyance speed of 400 mm/s, and is fed from the skew correction rollers 72 at conveyance speed of 300 mm/s. Both the sheet feed speed and the process speed are set to be the lowest for the thick paper 3. The speed increase in the order of the thick paper 3, the thick paper 2, the thick paper 1, and the plain paper, and the speed is set to be highest for the plain paper. The speed for the recycled paper is set to be the same as that for the plain paper.

Regarding the second and subsequent sheets, the medium detection sensors 91 and 92 detect the physical property in the second detection mode with the second detection accuracy, which is relatively low. When the conveyance speed of the sheet increases, the number of times of sampling by the medium detection sensors 91 and 92 decreases. For this reason, the number of pieces of sampling data obtained per light source (LED) is reduced, and the detection accuracy is inevitably lowered.

Referring back to FIG. 6, for the eighth sheet from the first job (J1), the medium detection sensors 91 and 92 that have performed detection in the second detection mode detect a change in the physical property (see "DATA OUTPUT" in FIG. 6). If the change amount of the physical property exceeds the threshold, it is determined that the sheet type has changed, that is, there has been addition. This sheet is a sheet in the middle of the second job (J2). Therefore, regarding the remaining sheets of the second job (J2), the medium detection sensors 91 and 92 continue to perform detection in the second detection mode. However, the detection in the first detection mode may be performed on the sheet subsequent to the eighth sheet for which the change in the physical property has been detected.

The medium detection sensors 91 and 92 perform detection in the first detection mode on the first sheet of the next job (J3). By this detection, the sheet type is determined to be the thick paper 2. Then, the image forming condition corresponding to the thick paper 2 is set, and the detection in the second detection mode is performed from the second sheet of the job (J3). Since the sheets of the job (J4) are not added, the detection in the second detection mode is performed.

FIG. 8 is a diagram illustrating the number of times of detection in the first detection mode and the second detection mode. In FIG. 8, it is illustrated that the detection is performed at timings indicated by black triangles.

The detection is performed in a detection distance range until the sheet M is conveyed to the skew correction rollers 72. In the first detection mode, the detection is repeated five times, that is, (1) to (5). In the second detection mode, the detection is repeated twice, that is, (1) and (2).

Figures 9A, 9B:
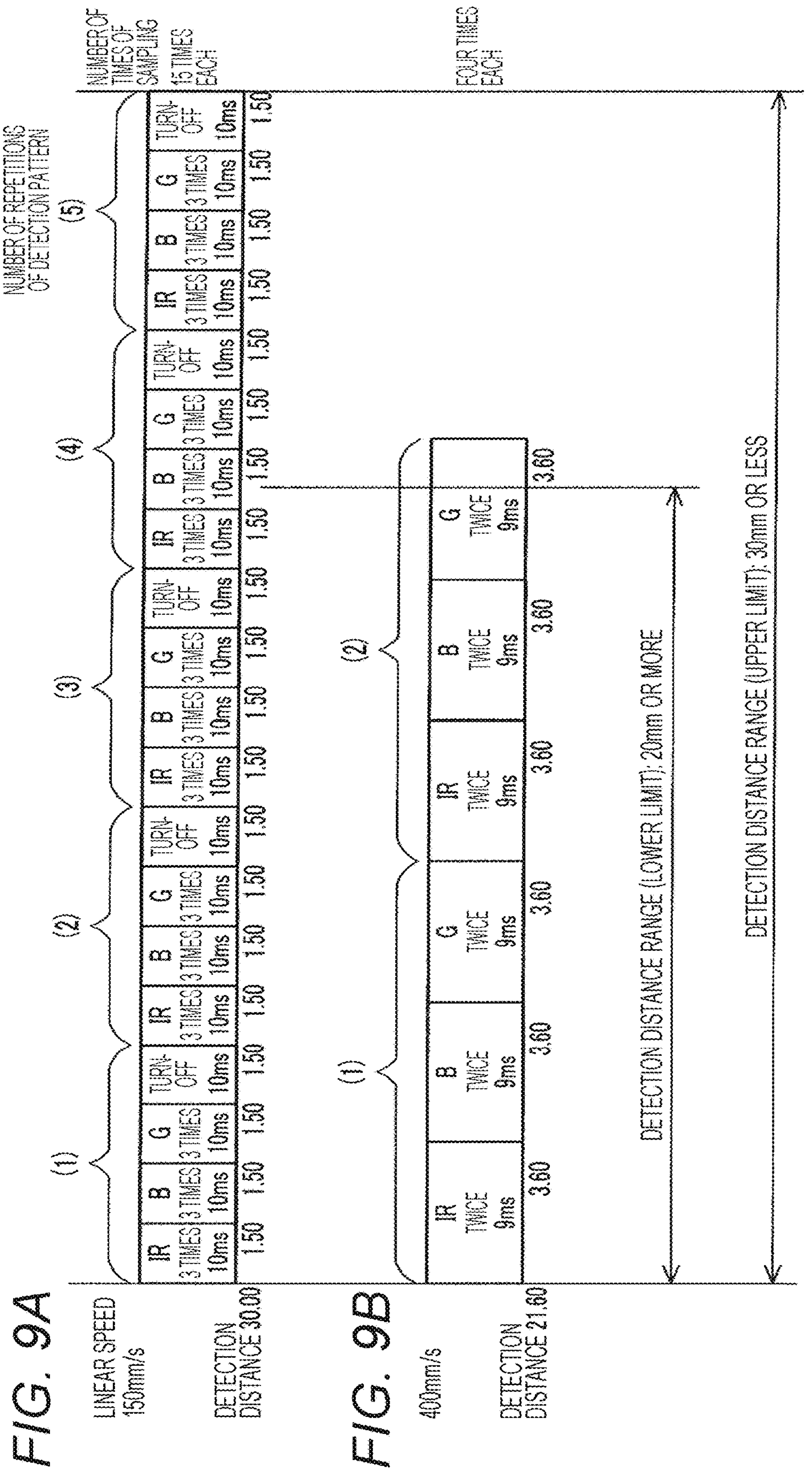
FIG. 9A is a diagram illustrating details of an example of detection operation in the first detection mode.
FIG. 9B is a diagram illustrating details of an example of detection operation in the second detection mode.

FIG. 9A is a diagram illustrating details of an example of detection operation in the first detection mode, and FIG. 9B is a diagram illustrating details of an example of detection operation in the second detection mode. Each of FIGS. 9A and 9B illustrates detection operation for one sheet. The upper limit of the detection distance range is set to 30 mm, and the lower limit is set to 20 mm. Therefore, the detection distance range is set to 20 mm to 30 mm.

In the first detection mode illustrated in FIG. 9A, the sheet is conveyed at linear speed (conveyance speed) of 150 mm/s, and as described with reference to FIG. 8, detection is repeated for one sheet in the detection pattern performed five times (1) to (5).

In the first detection pattern (1), the light receiving element 91*c* detects reflected light and/or transmitted light when an infrared light source (IR), a blue light source (B), and a green light source (G) of the optical sensor 91 sequentially irradiate the sheet M. Thereafter, a transition is made to the next detection pattern (2) after a turning-off time, and this is repeated until the detection pattern (5).

In each detection pattern, the time during which the infrared light source (IR) irradiates the sheet M, the time during which the blue light source (B) irradiates the sheet M, and the time during which the green light source (G)

irradiates the sheet M are all 10 ms. During 10 ms, the sheet M is conveyed for 1.50 mm, and irradiation by corresponding one of the light sources and light reception are performed three times during that time. That is, light emission from the infrared light source (IR) and light reception are performed three times during 10 ms, and three pieces of sampling data are obtained. During the next 10 ms, light emission from the blue light source (B) and light reception are performed three times, and three pieces of sampling data are obtained. Furthermore, during the next 10 ms, light emission from the green light source (G) and light reception are performed three times, and three pieces of sampling data are obtained. The next 10 ms is the turning-off time. Therefore, the time required for executing one detection pattern is 40 ms, and the sheet M is conveyed for 6 mm during that time.

When the turning-off time in the detection pattern has elapsed, the process moves to the next detection pattern. With the end of the detection pattern (5), the first detection mode ends. The time required for the first detection mode is 200 ms, the detection distance is 30.00 mm, and the number of times of sampling of detection for each of the light sources is 15 times.

In the second detection mode illustrated in FIG. 9B, the sheet is conveyed at linear speed (conveyance speed) of 400 mm/s, and as described in FIG. 8, detection is repeated for one sheet in the detection pattern performed twice, (1) and (2).

In the first detection pattern (1), the light receiving element 91*c* detects reflected light and/or transmitted light when the infrared light source (IR), the blue light source (B), and the green light source (G) of the optical sensor 91 sequentially irradiate the sheet M. After completion of the first detection pattern (1), the process proceeds to the next detection pattern (2). No turning-off time exists.

In each of the detection patterns, the time during which the infrared light source (IR) irradiates the sheet M, the time during which the blue light source (B) irradiates the sheet M, and the time during which the green light source (G) irradiates the sheet M are all 9 ms. During 9 ms, the sheet M is conveyed for 3.60 mm, and irradiation by corresponding one of the light sources and light reception are performed twice during that time. That is, light emission from the infrared light source (IR) and light reception are performed twice during 9 ms, and two pieces of sampling data are obtained. During the next 9 ms, light emission from the blue light source (B) and light reception are performed twice, and two pieces of sampling data are obtained. Furthermore, during the next 9 ms, light emission from the green light source (G) and light reception are performed twice, and two pieces of sampling data are obtained. Therefore, the time required to execute one detection pattern is 27 ms, and the sheet M is conveyed for 10.80 mm during this time.

When the first detection pattern (1) ends, the process moves to the second detection pattern (2). With the end of the second detection pattern (2), the second detection mode ends. The time required for the second detection mode is 54 ms, the detection distance is 21.60 mm, and the number of times of sampling of detection for each of the light sources is four times. FIG. 10 is a table illustrating an example of a combination of sheet feed speed and detection parameters. Detection parameters are set for each of the sheet feed speeds 150 mm/s, 200 mm/s, and 400 mm/s, and the detection parameters are switched according to the sheet feed speed. The number of light emitting elements (LEDs) used for detection is three in each case.

The number of times of detection per section is three times in a case where the sheet feed speed is 150 mm/s, and is two times in both of the case where the sheet feed speed is 200 mm/s and the case where the sheet feed speed is 400 mm/s. One section is a section in which detection is performed by one light emitting element in one detection pattern. In the case of FIG. 9A, one section is 10 ms and 1.50 mm. In the case of FIG. 9B, one section is 9 ms and 3.60 mm.

Furthermore, the time required for one detection is 0.010 seconds (10 ms) in the case where the sheet feed speed is 150 mm/s, and is 0.009 seconds (9 ms) in both of the case where the sheet feed speed is 200 mm/s and the case where the sheet feed speed is 400 mm/s. The time required for one detection is a time in which detection is performed by one light emitting element in one detection pattern, that is, the time of one section.

The turning-off time of each detection pattern is 0.010 seconds (10 ms) in both of the case where the sheet feed speed is 150 mm/s and the case where the sheet feed speed is 200 mm/s, and no turning-off time is present in the case of 400 mm/s.

The number of repetitions of the detection pattern is five times in the case where the sheet feed speed is 150 mm/s, four times in the case where the sheet feed speed is 200 mm/s, and twice in the case where the sheet feed speed is 400 mm/s.

The number of times of sampling for each of the light emitting elements is 15 in the case where the sheet feed speed is 150 mm/s, eight in the case where the sheet feed speed is 200 mm/s, and four in the case where the sheet feed speed is 400 mm/s.

The detection time excluding the turning-off time is 0.150 seconds (150 ms) in the case where the sheet feed speed is 150 mm/s, 0.108 seconds (108 ms) in the case where the sheet feed speed is 200 ms/s, and 0.054 seconds (54 ms) in the case where the sheet feed speed is 400 mm/s.

The detection distance range is 30.0 mm in the case where the sheet feed speed is 150 mm/s and is 21.6 mm in both of the case where the sheet feed speed is 200 mm/s and the case where the sheet feed speed is 400 mm/s.

As described above, in the present embodiment, in the first detection mode, the sheet feed speed of the sheet M is decreased, physical property detection is performed with the relatively high first detection accuracy, and the sheet type is determined. After the determination of the sheet type, the sheet feed speed of the sheet M is increased. If the sheet feed speed of the sheet M increases, the number of times of sampling decreases. In addition, the detection time is shortened. Therefore, the detection accuracy (second detection accuracy) is lower than the first detection accuracy in the first detection mode. Note that if the number of times of sampling is reduced from 15 times to four times, the variation becomes $(1/\sqrt{4})/(1/\sqrt{15}) \approx$ two times, and the detection accuracy decreases.

Even if the detection accuracy is lowered in the second detection mode, it is sufficient to detect a change in the physical property of the sheet M and determine the presence or absence of addition of the sheet M. Rather, productivity is improved by increasing the sheet feed speed.

Although one embodiment of the present invention has been described above, the present invention is not limited to the above-described embodiment. For example, in the second detection mode, the sheet feed speed is increased, the number of times of sampling of detection is reduced, the detection time is shortened, and the detection accuracy is lowered. The method of lowering the detection accuracy is not limited thereto. For example, in a case where the physical property of coated paper, non-coated paper, and the like are detected using an image sensor, as the sheet feed speed increases, the imaging area of the image sensor may be reduced to shorten the time required for imaging, image processing, and the like. By reducing the imaging area of the image sensor, the detection accuracy is lowered.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:

a conveyor that conveys a sheet along a conveyance path;

a detector that is disposed on the conveyance path and detects a physical property of a sheet with first detection accuracy or second detection accuracy lower than the first detection accuracy;

an image former that forms an image on a sheet under an image forming condition based on a result of detection performed by the detector with the first detection accuracy; and a central processing unit (CPU) that determines that a physical property of a sheet has changed among a plurality of sheets that is conveyed by the conveyor along the conveyance path on a basis of a result of detection performed by the detector on the plurality of sheets that is conveyed with the second detection accuracy, wherein the conveyor makes conveyance speed at which the detector performs detection with the second detection accuracy faster than conveyance speed at which the detector performs detection with the first detection accuracy.

2. The image forming apparatus according to claim 1, wherein a number of times of sampling when the detector performs detection with the second detection accuracy is smaller than a number of times of sampling when the detector performs detection with the first detection accuracy.

3. The image forming apparatus according to claim 1, wherein detection time in which the detector performs detection with the second detection accuracy is shorter than detection time in which the detector performs detection with the first detection accuracy.

4. The image forming apparatus according to claim 1, wherein a detection area when the detector performs detection with the second detection accuracy is narrower than a detection area when the detector performs detection with the first detection accuracy.

5. The image forming apparatus according to claim 1, wherein in one print job, the detector performs detection operation on a first sheet with the first detection accuracy, and the detector performs detection operation on second and subsequent sheets with the second detection accuracy.

6. The image forming apparatus according to claim 1 further comprising:

a container that contains a sheet, wherein the detector performs detection operation on a first sheet after opening and closing operation of the container is performed with the first detection accuracy, and the detector performs detection operation on second and subsequent sheets with the second detection accuracy.

7. The image forming apparatus according to claim 1, wherein in a case where the CPU determines that a physical property of a sheet has changed among the plurality of sheets that is conveyed, the detector performs detection operation on a sheet after the CPU determines that the physical property of the sheet has changed or a first sheet of a next print job with the first detection accuracy.

8. An image forming apparatus comprising:

a conveyor that conveys a sheet along a conveyance path;

a detector that is disposed on the conveyance path and detects a physical property of a sheet with first detection accuracy or second detection accuracy lower than the first detection accuracy;

an image former that forms an image on a sheet under an image forming condition based on a result of detection performed by the detector with the first detection accuracy;

a central processing unit (CPU) that determines that a physical property of a sheet has changed among a plurality of sheets that is conveyed by the conveyor along the conveyance path on a basis of a result of detection performed by the detector on the plurality of sheets that is conveyed with the second detection accuracy; and an operation panel, wherein the CPU outputs a determination result to the operation panel or an external apparatus upon determining that a physical property has changed among the plurality of sheets that is conveyed.

9. A method for processing information relating to a sheet comprising:

by a conveyor, conveying a sheet along a conveyance path;

by a detector that is disposed on the conveyance path, detecting a physical property of a sheet with first detection accuracy or second detection accuracy lower than the first detection accuracy;

forming an image on a sheet under an image forming condition based on a result of detection performed by the detector with the first detection accuracy; and determining that a physical property of a sheet has changed among a plurality of sheets that is conveyed by the conveyor along the conveyance path on a basis of a result of detection performed by the detector on the plurality of sheets that is conveyed with the second detection accuracy, wherein by the conveyor, making conveyance speed at which the detector performs detection with the second detection accuracy faster than conveyance speed at which the detector performs detection with the first detection accuracy.

10. A non-transitory recording medium storing a computer readable program for causing a computer of an image forming apparatus including a conveyer that conveys a sheet along a conveyance path, and a detector that is disposed on the conveyance path and detects a physical property of a sheet with first detection accuracy or second detection accuracy lower than the first detection accuracy, to form an image on a sheet under an image forming condition based on a result of detection performed by the detector with the first detection accuracy, and to determine that a physical property of a sheet has changed among a plurality of sheets that is conveyed by a conveyor along the conveyance path on a basis of a result of detection performed by the detector on the plurality of sheets that is conveyed with the second detection accuracy, wherein to make, by the conveyor, conveyance speed at which the detector performs detection with the second detection accuracy faster than conveyance speed at which the detector performs detection with the first detection accuracy.

* * * * *